July 9, 1968  W. M. WILSON  3,391,897
DIAPHRAGM AND PISTON ACTUATED VALVE MECHANISM
Filed April 4, 1966

INVENTOR
WARREN M. WILSON
BY Hoffmann and Yount
ATTORNEYS

United States Patent Office 3,391,897
Patented July 9, 1968

3,391,897
DIAPHRAGM AND PISTON ACTUATED VALVE MECHANISM
Warren M. Wilson, Parma, Ohio, assignor to W. M. Wilson Co., Inc., Strongsville, Ohio, a corporation of Ohio
Filed Apr. 4, 1966, Ser. No. 539,986
8 Claims. (Cl. 251—26)

ABSTRACT OF THE DISCLOSURE

The present invention provides a valve which is actuated by a diaphragm actuator to regulate pressure therethrough and is actuated by a piston to provide an on-off function, wherein the diaphragm is not flexed while the piston actuator is moving the valve to the on-off positions.

---

The present invention relates to a valve mechanism and particularly relates to a diaphragm valve mechanism which is operable to regulate fluid pressure in a fluid conduit and to initiate and shut off fluid flow through the conduit.

A diaphragm valve is commonly used to regulate the pressure of a fluid medium in a fluid conduit. Such a valve includes a flexible diaphragm which effects movement of a valve member upon flexing thereof. The diaphragm flexes in response to a differential in pressures acting on opposite sides of the diaphragm. By controlling the pressures acting on the diaphragm, accurate regulation of the rate of flow through the valve and of the pressure in the outlet conduit may be effected. These valves also have been used as on-off valves to initiate and shut off flow to the outlet conduit, and in certain instances, operate in this manner at a high frequency. This has been accomplished by causing a flexing of the diaphragm at a high frequency to move the valve member. To utilize diaphragm flexure for this on-off function in addition to the regulating of pressure causes the diaphragm to wear out rather rapidly and greatly affects the life of the valve.

Moreover, the diaphragm of certain of these valves is constructed of two diaphragm leaves and frequently moisture leaks therebetween. Subsequently, this moisture may flash into steam and drive the valve open and requires replacement of the diaphragm.

The principal object of the present invention is the provision of a new and improved diaphragm valve which is simple and practical in construction, reliable in operation, and durable and which is operable to accurately control the fluid pressure in an outlet conduit and also provide an on-off control for fluid flow thereto.

A further object of the present invention is the provision of a new and improved valve which is operable to regulate the pressure of a fluid in an outlet conduit connected therewith and also to effect on-off control of the flow and wherein a flexible diaphragm controls the pressure regulation and the on-off control is accomplished by separate means which operates without causing flexing of the diaphragm.

Another object of the present invention is the provision of a new and improved valve having a valve member which is independently and separately actuated by a diaphragm and a piston to produce different valve functions and wherein the piston actuation of the valve member does not flex the diaphragm thereby providing a long life for the diaphragm.

A still further object of the present invention is the provision of a new and improved valve, as noted in the preceding paragraph, wherein the valve member is spring biased to a closed position and the diaphragm is detachably connected to the valve member and operates to move the valve member to open the valve, and the piston member is also connected to the valve member to permit movement of the valve member relative thereto when moved by the diaphragm and which operates to move the valve member to an open position without moving the diaphragm member.

A further object of the present invention is the provision of a new and improved diaphragm valve having a diaphragm constructed of two leaves and a spring which biases the leaves together to thereby minimize the leaking of moisture between the leaves and subsequent damage that occurs due to flashing of the moisture therebetween.

Further objects and advantages of the present invention will be apparent to those skilled in the art to which it relates from the following detailed description thereof made with reference to the accompanying drawings forming a part of this specification and in which.

Figure 1:
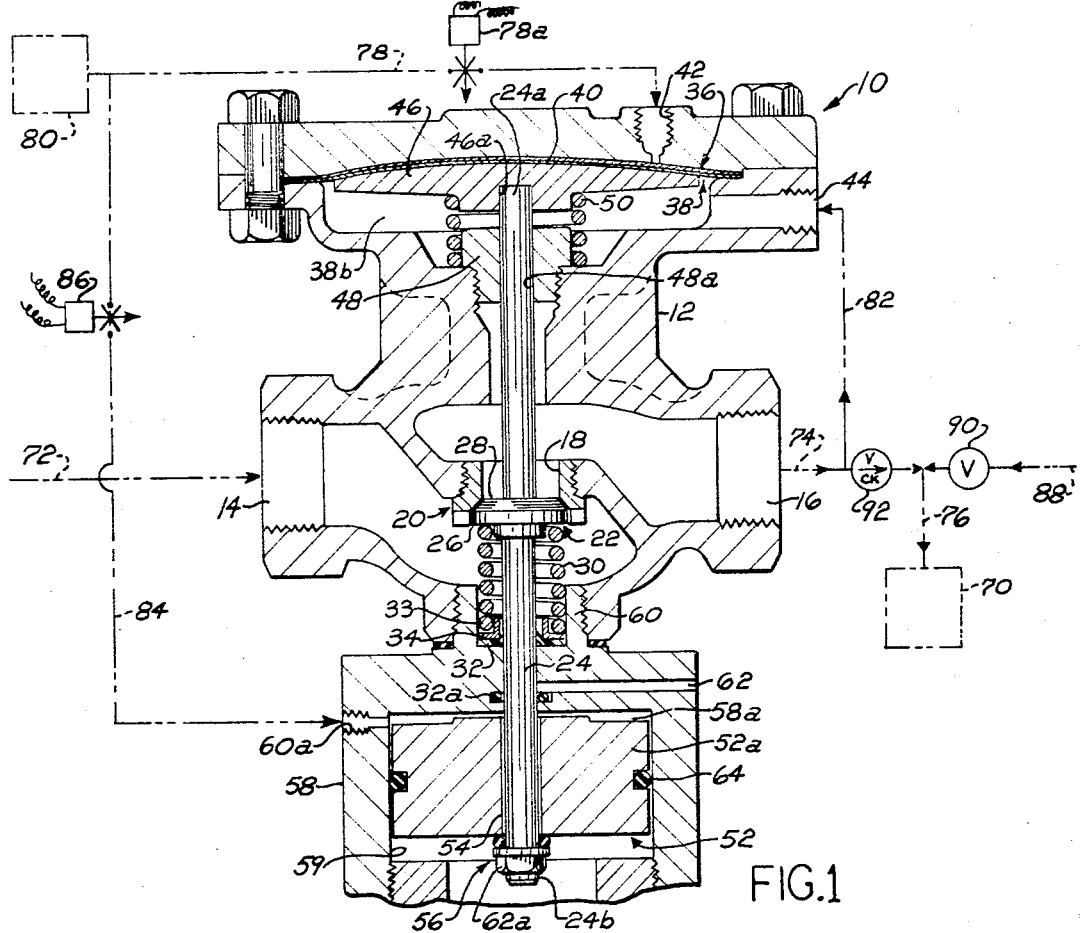
FIG. 1 is a vertical sectional view of a valve embodying the present invention and which is shown in conjunction with a system incorporating the valve and represented schematically.

The present invention provides a valve mechanism which is operable to regulate pressure and in addition provide an on-off control for fluid in a conduit. The regulation of pressure is provided by a diaphragm which actuates a valve member in response to a difference between acting on opposite sides of the diaphragm. In addition, the valve member is actuated by a mechanism separate from the diaphragm to open and close the valve and this control is accomplished without causing flexure or other movement of the diaphragm. Thus, since the diaphragm does not flex during on-off control, the diaphragm has a long life and is not stressed during the on-off control.

As representing a preferred embodiment of the present invention, the drawings illustrate a valve mechanism 10. The valve mechanism 10 comprises a valve body member 12 defining an inlet passageway 14 and an outlet passageway 16. The inlet and outlet passageways are connected by an intermediate passageway 18. The intermediate passageway 18 has a valve seat 20 formed at the end thereof communicating with passageway 14. A valve means 22 cooperates with the valve seat 20 to control fluid flow through passageway 18 and between the inlet passageway 14 and the outlet passageway 16.

The valve means 22 includes an elongated stem 24 and a valve member 26 fixedly connected to the stem 24 intermediate the ends of stem 24. The valve member 26 has a conical face 28 which is adapted to engage in seat 20 to block or shut off flow between inlet passageway 14 and the outlet passageway 16. Movement of the valve member 26 away from the seat 20 establishes communication between the inlet and outlet passageways permitting flow therebetween. The valve member 26 is biased into its closed position in engagement with the valve seat 20 by a spring 30. The spring 30 is a coil spring surrounding the stem 24 and acts between the valve member 26 and a Teflon seal 32 in the bottom of a bore 33 in the body 12.

Figure 2:
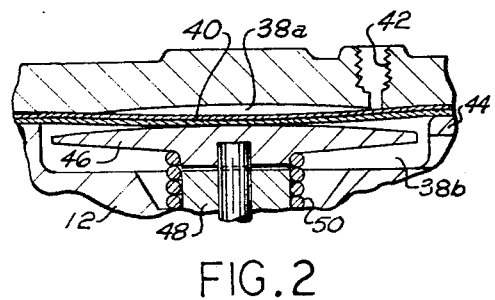
FIG. 2 is a fragmentary view of a portion of the valve shown in FIG. 1.

The valve mechanism 10 operates to maintain a predetermined pressure in outlet passageway 16 and includes a diaphragm actuator, indicated generally as 36, to effect movement of the valve member 26 to provide this control. The diaphragm actuator 36 includes a pressure chamber 38 formed in the upper portion of the valve body 12, as viewed in the drawings. A flexible diaphragm 40, preferably made of two or more stainless steel leaves, is mounted in the chamber 38 and extends therethrough so as to divide the chamber into chamber portions 38a and 38b when operating, as shown in FIG. 2. A diaphragm disc 46 abuttingly engages the underside of the diaphragm 40 and supports the diaphragm 40. The chamber 38 includes an inlet passageway 42 through which a control pressure medium is directed to apply a control pressure in chamber 38 on the upperside of the diaphragm 40, as viewed in the drawings. A second fluid inlet passageway 44 is provided in the body member 12 and through which the pressure in outlet passageway 16 is directed into chamber part 38b to act against the lower surface of the diaphragm 40. The stainless steel diaphragm 40 is flexible, and is supported for a flexing movement in response to a differential in the pressure acting on the upper and lower surfaces thereof, and, of course, moves toward the part of the chamber 38 having the lower pressure.

The movement or flexure of the diaphragm 40 is imparted to the valve stem 24 by the diaphragm disc 46. The upper face of the disc 46, as noted, abuttingly engages the underside of diaphragm 40 and is slidably connected at its lower side to the upper end 24a of the stem 24. The stem 24 engages the disc and moves upon movement of the disc 46 by the diaphragm 40. The slidable connection is provided by a stem receiving opening 46a in disc 46 and into which the stem end 24a is slidably received. The stem 24 is thus free to move relative to the disc 46 to permit the valve member 26 to move relative to the diaphragm actuator 36 for a purpose to be described hereinbelow. The stem end 24a is guided during movement by a threaded plug member 48. The member 48 has a central aperture 48a which slidably supports the stem of the valve member 22. The plug member also seals the chamber 38 from the other parts of the body.

The diaphragm disc 46 is biased into engagement with the lower side of the diaphragm 40 by a coil spring 50. The spring 50 surrounds a portion of the plug 48 and acts between a portion of the body and underside of the disc member 46. The spring 50, in addition to biasing the diaphragm disc 46 into engagement with the diaphragm 40, prevents the disc from shifting laterally and thus maintains the disc 46 centered. The spring 50 also acts to keep the diaphragm leaves forced together to prevent moisture from entering between them. The entry of moisture between the leaves through any cracks, etc., and the subsequent flashing of the moisture into steam would result in the opening of the valve member 26 improperly and would also necessitate replacement of the diaphragm.

From the above, it should be apparent that the diaphragm actuator 36 is operable to shift the valve member 26 away from engagement with valve seat 20 when the control pressure in chamber portion 38a is greater than the pressure in chamber portion 38b. When the pressure in chamber portion 38b exceeds the pressure in portion 38a, the valve member 26 is moved toward the valve seat 20 due to the biasing effect of spring 30. In this manner the diaphragm actuator 36 is effective to accurately regulate the pressure in outlet passageway 16 by effecting movement of the diaphragm in response to a differential in pressure between a control pressure and the pressure in the outlet passageway 16. These pressures acting on opposite sides of the diaphragm 40 regulate the setting of the valve means 22 and, in turn, the extent of fluid flow through the valve.

The valve mechanism 10 is also operable to perform an on-off function. The on-off function of the valve is provided by a piston actuator 52. The piston actuator 52 is connected to the end 24b of the stem 24 and is operable to move the valve member 26 against the bias of spring 30 away from seat 20 to open the intermediate passageway 18 and connect inlet and outlet passageways 14 and 16. The piston actuator 52 includes a piston member 52a which has an aperture 54 through which stem end 24b extends. Sufficient clearance is provided between the stem 24 and piston 52a to permit the stem 24 to move relative to the piston 52a during movement of the valve member 26 by the diaphragm 40. This clearance permits the diaphragm 40 to move the valve member 26 without dragging the piston 52a therewith.

The piston 52a reciprocates in a cylinder 58 having an open ended bore 59. The cylinder 58 has a neck portion 60 which is threadably secured to a part of the valve body 12 to form a part thereof. The neck portion 60 has a bore 33 within which the seal 32 and the spring 30 are supported. The upper portion of the cylinder 58 has an opening to permit passageway therethrough of the stem 24 and guides the stem 24 as it moves relative thereto.

The piston 52a is moved in cylinder 58 by a control fluid pressure, preferably air, which is directed through a fluid inlet 60a into the upper portion of the cylinder bore 59 to act on the upper surface of the piston 52a. Downward movement of the piston 52a moves connected stem 24 downward and unseats valve member 26 opening the valve 10. This downward movement of the stem 24 is effected by the piston due to the fact that the piston 52a engages a seal carried on the lower end of the stem between the piston and a suitable nut member 62a threaded onto the stem and which acts as an abutment. The nut member 62a could be a friction type nut. This downward movement of the piston 52a loads the spring 30. An adjustable stop 59a is threaded into the bore 59 to engage piston 52a and prevent undue pressure from being imposed on spring 30 and Teflon seal 32 when the piston 52a moves to open the valve.

When the pressure above piston 52a is reduced, the spring 30 is effective to move the valve means 22 and the piston 52a to their respective positions illustrated in FIG. 1 closing the valve 10. The pressure above the piston 52a may be reduced in any suitable manner by a suitable vent. The venting may be preferably effected by a suitable valve in the air conduit. A passageway 62 is provided in cylinder 58 to vent the stem 24 intermediate the Teflon seal 32 and the O-ring seal 32a, each of which acts to seal the stem 24 against loss of fluid from valve inlet 14, and upper bore 58a of cylinder 58, respectively. Because of this venting to atmosphere via 62, failure of either Teflon seal 32 or O-ring seal 32a is readily detected. A suitable seal such as an O-ring seal 64 is provided for piston 52a to effectively seal the piston in the cylinder 58 for operation.

When the valve member 26 is moved by the piston 52a to an open position, this movement is effected without movement of the diaphragm 40. This, of course, is due to the slidable connection between the stem 24 and disc 46. The stem 24 merely moves relative to the disc 46 without any movement of the diaphragm occuring. As a result, the diaphragm life is not affected by an on-off control of the valve 26 which could operate any number of times at a high frequency.

The valve mechanism 10 has application in many environments but for purposes of illustrating its operation, the valve operation will be discussed in connection with a tire forming press 70 represented schematically in FIG. 1. The tire press requires several different pressures of steam during different stages of the tire forming operation. Part of this pressure is supplied by a steam line 72 which is connected to the valve inlet passageway 14. Steam line 72 maintains a pressure of steam therein which is above the steam pressure requirements to be provided by the valve 10 and the valve mechanism 10 then functions as a reducing valve to provide the desired pressure to the tire press 70 through lines 74 and 76.

Assuming for purposes of illustration that the first steam pressure required by the tire press 70 is 20 p.s.i.g. and that the steam pressure in the line 72 is approximately 100 p.s.i.g., to establish and maintain 20 p.s.i.g. through lines 74 and 76, a control pressure is introduced through control lines 78 into the chamber portion 38a. The control pressure in line 78 is regulated by a pressure regulator 80 which directs the necessary control pressure through line 78 and chamber inlet passageway 42 into chamber part 38a to operate the diaphragm actuator 36. Remote control of this loading pressure is effected by an electric solenoid three-way valve 78a in air line 78. This valve either supplies regulated air pressure to port 42, or vents same to atmosphere, depending on the action of the electric solenoid. Initially, there is no pressure in outlet passageway 16, and the control pressure in chamber portion 38a overcomes the biasing effect of springs 30 and 50 and the pressure in inlet passageway 14 and moves the diaphragm downwardly as viewed in the drawings, establishing steam communication between passageways 14 and 16 which is directed to the tire press 70 through lines 74 and 76. The opposed downward movement of the diaphragm provides for gradual flow through the valve.

The steam pressure in passageway 16 is communicated to chamber portion 38b and the effect of the control pressure in portion 38a is counteracted as the pressure builds up and the diaphragm moves to permit valve member 26 to move toward the seat 20 reducing the flow through the valve. The diaphragm continues to effect positioning of valve member 26 until the pressure in outlet line 74 reaches approximately 20 p.s.i.g. At this time, the control pressure is such as to stabilize the diaphragm 40 and the valve member is positioned relative to seat 20 to provide for flow of 20 p.s.i.g. of steam through the valve.

In the event the pressure drops below or raises above 20 p.s.i.g., the pressure in chamber portion 38b drops or raises accordingly and the diaphragm 40 effects the positioning of the valve member 26 to increase or decrease the flow through intermediate passageway 18. This "seeking" of the valve member 26 under control of the diaphragm 40 and spring 30 maintains the desired pressure of 20 p.s.i.g. in lines 74 and 76. When this pressure is no longer required by the press 70, the pressure in chamber part 38a is vented via solenoid valve 78a and the spring 50 moves the diaphragm disc 46 and diaphragm 40 to its uppermost position in chamber 38 and permits closure of the valve member 26 by the spring 30. During pressure regulator control of the valve by diaphragm actuator 36, the piston 52 is not moved or dragged along by the diaphragm since the connection between the piston 52a and the valve member 26 permits the stem to move relative to the piston member as described heretofore. If the tire press 70 requires a different steam pressure, it is provided by adjusting the regulator 80 to control pressure delivered to the chamber portion 38a and the diaphragm actuator operates to maintain this pressure.

The tire forming press 70 utilizes an inflatable bag which must be heated by the steam in line 72 when the machine is not operating. For the bag warming cycle, the valve mechanism 10 must function as an on-off valve to periodically direct steam into the bag. This function is accomplished by the piston actuator 52 which moves the valve to open position and then permits it to be closed by spring 30. The piston is operated by air under a predetermined pressure provided by pressure regulator 80. The regulator is connected to cylinder 58 by a line 84 which is connected to the inlet passageway 60a in the cylinder. As the pressure builds up on the upper end of the piston 52, the piston moves downward in the cylinder 58 moving the valve member 26 out of seating engagement with the intermediate passageway 18 establishing steam flow through the valve into the bag of the apparatus 70. A pressure sensor, not shown, is associated with steam lines 74, 76 and operates a three-way electric solenoid valve 86 in line 84. When a predetermined pressure is established in lines 74, 76, the flow of air is stopped and region 58a above piston 52a is vented simultaneously via valve 86. This permits the spring 30 to move the piston 52a upward and effect closing of valve 22. When the steam pressure in lines 74, 76 drops a predetermined amount, the sensor actuates the solenoid valve 86 in the opposite direction, which closes its vent and supplies air pressure above the piston 52a via port 60a. This causes the piston 52a to move downward and open valve 22 until the predetermined pressure is again established in lines 74, 76 and then the cycle is repeated. This on-off action produces a "breathing" action of the inflatable bag which causes live steam to be circulated therein and keep same warm. This on-off operation continues until such time as the tire press is again put into operation.

During the bag warming cycle, the piston actuator operates the valve member without operating or flexing the diaphragm 40. This is provided by the slidable connection between the stem 24 and the receiving opening 46a in diaphragm disc 46. When the piston member 52 moves downwardly in cylinder 58 to open the valve, the stem end 24a moves relative to the diaphragm disc 46. The stem receiving opening 46a in the disc is maintained in axial alignment with the relatively movable stem end 24a by the spring 50 so that the disc opening 46a cannot shift out of alignment with the valve stem 24 and prevent the valve from closing.

The tire press 70 also requires a steam pressure higher than the pressure maintained in line 72. For this purpose, a separate steam line 88 is provided and flow therethrough is controlled by a valve 90. When the valve 90 is opened, the steam in line 88 is directed to the apparatus 70 through the line 76. A check valve 92 is provided in line 74 to prevent the higher steam pressure in line 88 from reaching the pressure line 72.

Figure 3:
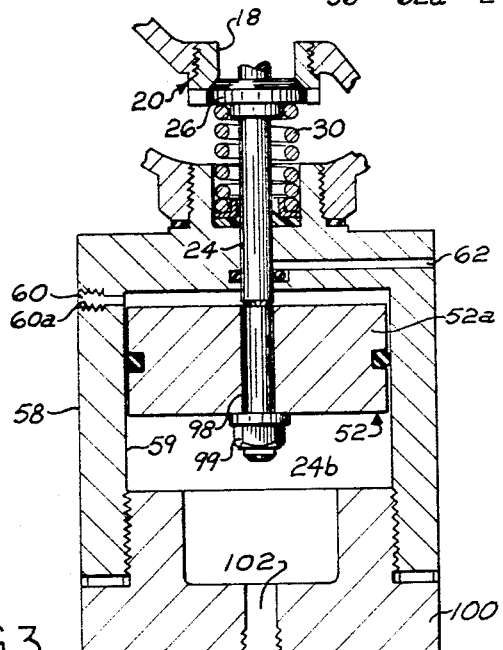
FIG. 3 is a sectional fragmentary view showing an alternative embodiment of the valve of FIG. 1.

Alternatively, the function of the check valve 92 can be provided by modifying the piston actuator arrangement. This modification is illustrated in FIG. 3 of the drawings. In this arrangement the stem 24 has an end portion 98 of reduced diameter on which the piston 52 is mounted so that the piston 52 and stem 24 always move as a unit. The piston is secured to the stem by a lock nut and washer assembly 99. When the piston moves downwardly by directing fluid under pressure through pressure inlet 60a, the stem 24 moves therewith to open the valve. Discontinuing pressure to the inlet passageway 60 permits the spring 30 to return the stem and piston to their positions illustrated in FIG. 3. The cylinder 58 is closed at its bottom by a cover member 100 which is threadedly secured to the lower portion of the cylinder. The cover member 100 has an inlet passageway 102 therein which directs pressure against the underside of the piston 52 to move the piston away from cover member 100.

The modified piston and cylinder arrangement disclosed in FIG. 3 operates substantially the same as described in connection with the arrangement of FIG. 1 with the exception that all movements of the valve means 22 by the spring 30 and the diaphragm actuator 36 causes the piston member 52 to be dragged along with stem 24 due to the connection therebetween. When higher pressure is being delivered to the tire apparatus 70 through pressure line 88, the pressure in line 88 is communicated to the cylinder bore 59 through inlet 102 driving the piston away from cover member 100 which seats the valve member 26 in the passageway 18 blocking communication between passageways 14 and 16. With this arrangement, the function of check valve 92 is performed by the piston holding the valve member 26 closed so that pressure in the line 88 cannot overcome spring 30 and communicate with the pressure in line 72 and the check valve 92 can be eliminated from the circuit.

From the foregoing, it should be apparent that the present invention provides a valve which is actuated by a diaphragm actuator to regulate pressure therethrough and is actuated by a piston to provide an on-off function. The arrangement is such that while the piston actuator is moving the valve to the on-off positions, the diaphragm is not flexed and accordingly has a longer life.

The preferred embodiment of the present invention has been hereinabove described in considerable detail and certain modifications, changes, and adaptations may be made therein by those skilled in the art to which it relates, and it is hereby intended to cover all such changes, modifications, and adaptations which come within the scope of the appended claims.

Having described my invention, I claim:

1. A valve comprising a valve body having an inlet passageway and an outlet passageway, valve means operatively associated with said body and operable when in a first position to communicate said passageways and when in a second position to block communication therebetween, said valve means including an elongated stem, a valve member on said stem and movable therewith and having a surface adapted to engage a seat formed on said valve body when disposed in said second position, said valve body further having a first pressure chamber, a stainless steel diaphragm member dividing said chamber into first and second chamber portions, one end of said stem being disposed in one of said portions of said first pressure chamber and arranged to be detachably engaged and moved by said diaphragm member, means for introducing a control pressure in said first chamber portion to act on one side of said diaphragm member and means for introducing a pressure in said second chamber portion to act on the other side of said diaphragm member whereby establishing a differential in the pressures in said chamber portion effects movement of said valve member between said second and said first positions, said valve body further having a second pressure chamber which receives the opposite end of said stem, a piston reciprocable in said second chamber and operatively connected to said opposite end of said stem to effect movement of said valve member independent of flexure of said diaphragm member.

2. A valve as defined in claim 1 including means connecting said piston to said opposite end of said stem to permit relative movement therebetween when said valve member moves under control of said diaphragm means and is operable to effect movement of said valve member from said second position to said first position.

3. A valve as defined in claim 1 including means connecting said piston member to said opposite end of said stem to provide for movement of said piston member with said stem member, and further including means for directing a second fluid pressure into said second chamber to effect movement of said valve member from said first position to said second position.

4. A valve as defined in claim 1 including a spring biasing said valve member into said second position.

5. A valve as defined in claim 1 wherein said valve body further includes a connecting passageway communicating said inlet and outlet passageways and having a portion thereof defining said seat for said valve member.

6. A valve mechanism for regulating the pressure of a fluid in a fluid conduit and for providing an on-off fluid control comprising a valve body having an inlet passageway and an outlet passageway adapted to be connected to said fluid conduit, a valve member in said body movable in a first direction to increase communication between said passageways and in a second direction to decrease communication therebetween, means for biasing said valve member in said second direction, diaphragm actuator means including a flexible diaphragm member operatively connected to said valve member to move said valve member in said first direction upon flexure thereof to effect said pressure control, means separate from said diaphragm actuator means operatively connected to said valve member to move said valve member in said first direction independently of flexure of said diaphragm to effect said on-off control, said last named means comprising a piston actuator means operably connected to said valve member, said piston actuator including a pressure chamber in said valve body, a piston mounted for reciprocation in said chamber, means operatively connecting said piston to said valve member for movement therewith, means for directing a first pressure in said chamber to effect movement of said valve member in said first direction, and means for introducing a second pressure into said chamber operable to move said piston and said valve member in said second direction.

7. A valve mechanism for regulating the pressure of a fluid in a fluid conduit and for providing an on-off fluid control comprising a valve body having an inlet passageway and an outlet passageway adapted to be connected to said fluid conduit, a valve member in said body movable in a first direction to increase communication between said passageways and in a second direction to decrease communication therebetween, means for biasing said valve member in said second direction, diaphragm actuator means including a flexible diaphragm member operatively connected to said valve member to move said valve member in said first direction upon flexure thereof to effect said pressure control, means separate from said diaphragm actuator means operatively connected to said valve member to move said valve member in said first direction independently of flexure of said diaphragm to effect said on-off control, means connecting said diaphragm actuator to said valve member to permit said valve member to move relative to said diaphragm member when moved by said last named means, said valve member including an elongated stem, said diaphragm actuator means including a diaphragm engaging member detachably connected to one end of said stem and engaging said diaphragm in said pressure chamber, an opening in said diaphragm engaging member adapted to slidably receive said one end of said stem, and spring means biasing said diaphragm engaging member into engagement with said diaphragm to prevent axial disalignment of said stem and diaphragm engaging member.

8. A valve mechanism for regulating the pressure of a fluid in a fluid conduit and for providing an on-off fluid control comprising a valve body having an inlet passageway and an outlet passageway adapted to be connected to said fluid conduit, a valve member in said body movable in a first direction to increase communication between said passageways and in a second direction to decrease communication therebetween, means for biasing said valve member in said second direction, diaphragm actuator means including a flexible diaphragm member operatively connected to said valve member to move said valve member in said first direction upon flexure thereof to effect said pressure control, means separate from said diaphragm actuator means operatively connected to said valve member to move said valve member in said first direction independently of flexure of said diaphragm to effect said on-off control, said last named means comprising a piston actuator means operably connected to said valve member, said piston actuator including a pressure chamber in said valve body, a piston mounted for reciprocation in said chamber, means operatively connecting said piston to said valve member for movement therewith, and means for directing a first pressure in said chamber to effect movement of said piston and said valve member in said first direction.

References Cited

UNITED STATES PATENTS

| | | | |
|---|---|---|---|
| 1,894,391 | 1/1933 | Barrett et al. | 251—14 X |
| 2,198,070 | 4/1940 | Wile | 137—505.37 |
| 2,261,364 | 11/1941 | Grove | 137—505.37 X |
| 2,667,786 | 2/1954 | Spaulding | 92—103 |

A. ROSENTHAL, *Primary Examiner.*